June 29, 1937.  W. H. G. MURRAY ET AL  2,085,441
PROTECTED CONDUIT
Filed Nov. 11, 1936
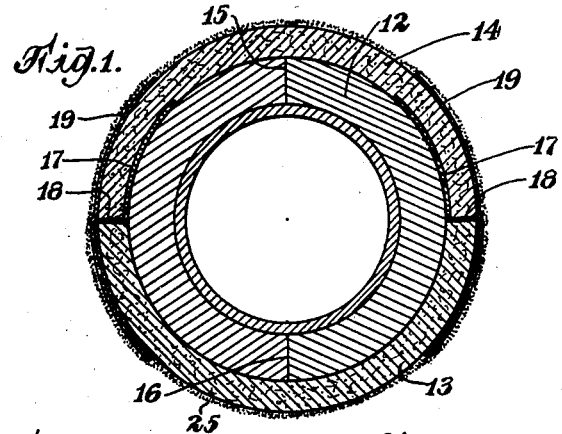
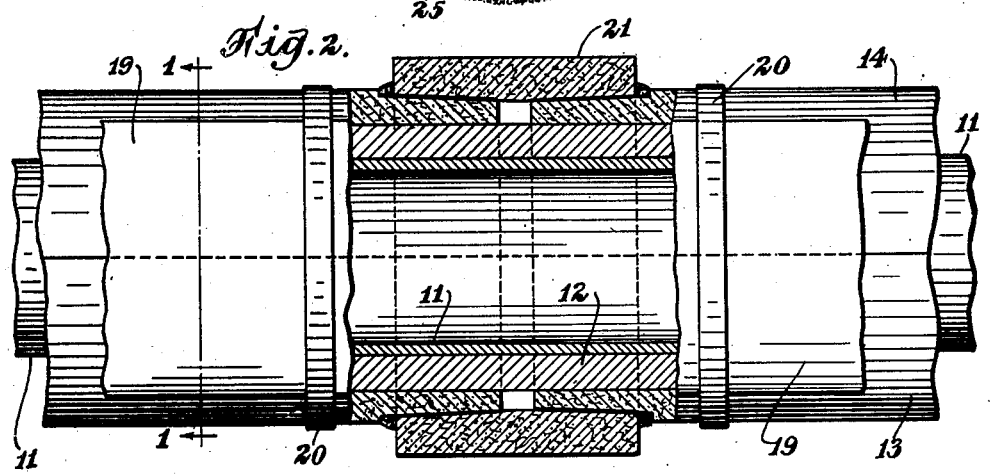
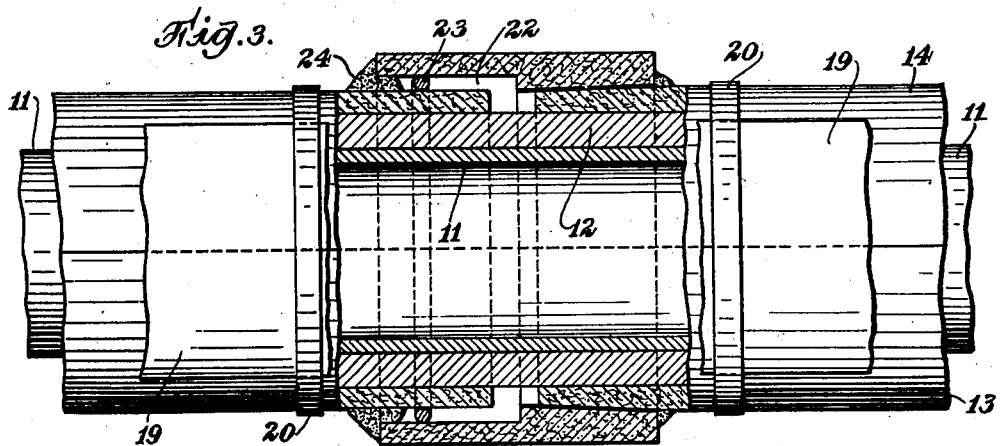
INVENTORS.
WILLIAM H.G. MURRAY.
GEORGE H. MINER.
BY
ATTORNEY Patented June 29, 1937

2,085,441

UNITED STATES PATENT OFFICE 2,085,441

PROTECTED CONDUIT

William H. G. Murray and George H. Miner, Syracuse, N. Y., assignors to Johns-Manville Corporation, New York, N. Y., a corporation of New York Application November 11, 1936, Serial No. 110,201

7 Claims. (Cl. 138—64)

This invention relates to a protected conduit and, particularly, to one having special means for flashing longitudinal joints or closing end joints between the units of protecting material.

The invention is useful in connection with conduits of various kinds, as, for example, electrical conduits, water lines, steam lines or the like. The invention will be illustrated, particularly, by description in connection with insulated underground steam lines.

There has been need for some time of means for protecting the insulation of underground steam lines from mechanical injury or crushing and also from water. Entrance of water, for instance, into the lightweight insulating materials commonly used not only causes a great reduction in the efficiency of the insulation but also may weaken the insulation to the extent that it may disintegrate. The results of wetting are especially bad when a conduit is alternately at ordinary temperatures and at steam temperatures; water gaining access to the insulation when cold may be rapidly evaporated when steam is turned into the pipe, so that the resulting evaporation of water may be so sudden as to cause rupture of certain insulating pipe covering.

The invention will be exemplified by description in connection with the attached drawing.

Fig. 1 is a cross sectional view of a conduit constituting the preferred embodiment of the invention, the view being taken on section line 1—1 of Fig. 2.

Fig. 2 is a longitudinal view of the conduit, partly broken away for clearness of illustration.

Fig. 3 is a similar view of an assembly at the portion thereof including an expansion joint.

There is shown an elongated member such as the steam pipe 11 that is to be insulated and protected.

Disposed around the pipe is the thermal insulation 12 which, in transverse cross section, has practically a circular exterior surface. This insulation may be constituted of any suitable materials. It should be one that is not so soft as to be crushed badly under the conditions of use that are described, sufficiently firm to support the protecting members in the assembly illustrated, and adapted to adhere to the adhesive material to be described later. We have used to advantage so called 85% magnesia as the insulating material. Other compositions may be used including hair felt or spirally wound sheets of asbestos paper including particles of sponge or other spacing elements.

Enclosing the tubular insulating material is the protecting assembly. This assembly includes tubular sections, such as pairs of semitubes 13 and 14 meeting at their longitudinal edges, to form joints. When the elongated member 11 extends generally horizontally, it is desirable to have these joints spaced about 180° apart and at the sides of (laterally with respect to) the insulation. Likewise, the insulation may be applied as semitubes meeting at the longitudinal edges thereof, to form joints 15 and 16, the one above and the other below the member 11. With an arrangement of this type, the joints in the insulation and between the semitubes of the protecting assembly are out of register with each other or staggered.

As the material of construction of the semitubes 13 and 14, we have used to advantage materials forming tubes of such resistance to bending or collapse as to provide adequate protection for the insulation. Preferably, these semitubes 13 and 14 are rigid. While they may be constructed of iron, clay tile, or other material meeting the requirements stated, we have found particularly desirable results when these semitubes are made of hardened asbestos and cement compositions. Such semitubes may be made by forming asbestos-cement pipe under strong compression, hardening the pipe and then severing it longitudinally into the semitubes. The asbestos and cement material is very strong in proportion to its weight, may be used in wall thicknesses that are small, for example, a fourth to a half inch and is resistant to corrosion and electrolysis.

The protective assembly includes also a flashing element 17 extending through each of the longitudinal joints 18, upwardly behind the semitube 14 above the joint, and downwardly outside or in front of the semitube 13 that is below the joint.

Suitably, also, a flashing sheet 19 is applied over the longitudinal joints, as illustrated.

The said flashing element and sheet may contain, to advantage, a fabricated base such as a cloth or sheet of felted fibres. Thus, we have used as the element 17 an asphalt-impregnated strip of canvas and, as the sheet 19, a heavily impregnated felt of the type commonly used in prepared roofing, an asphalt impregnated asbestos felt being preferred but an asphalt or tar saturated rag felt being satisfactory for some constructions.

When the element 17 and sheet 19 are placed in position, they are heavily coated with a waterproof adhesive material, such as an asphalt composition in fluent form.

In making a construction of the kind described, the pipe in an underground trench or other desired location is insulated in usual manner. The lower semitube 13 is then brought into the position shown in the figures. Strips 17 are heavily coated on both sides with asphalt, tar, or other suitable adhesive material, and pressed against the upper edge portions of the semitube 13 and against the overlying portions of the insulation 12. The element 17, at the part thereof passing over the upper edge of the lower semitube, is then pressed downwardly against the edge, as by being squared up with a trowel or other suitable tool. Next, the upper semitube 14 is laid in position and pressed downwardly firmly. Finally, the outer flashing sheet 19, if it is to be used, is heavily coated with an adhesive material of the kind described and is laid over a longitudinal joint between the abutting semitubes and is pressed into position. The zones of meeting of the edges of the sheet 19 with the semitubes may be painted over with a thick coat of the adhesive material.

As a result of these steps, the flashing element 17 and the flashing sheet 19 are adhered substantially continuously to the semitubes, except that the lower portion of the flashing member 19 is adhered to the lower portion of the flashing element 17. Also, the element 17 is adhered to the abutting longitudinal edges of the semitubes. (The adhesives described are not shown in the drawing.)

In order to assist in maintaining the watertight closing of the longitudinal joints, the semitubes are held or forced together at close intervals, say every foot or two, by means of metal bands 20 secured around the assembly. These bands may be of the Acme type. Also, the semitubes are forced or pressed firmly in the direction of each other by means of the couplings 21 which close the end joints between adjacent sections of the tubular assembly. These couplings may be of the conventional tapered pattern and the ends of the sections of semitubes fitting therewithin tapered to conform. Furthermore, these ends should be heavily coated with asphalt or like waterproof material before being inserted into the coupling.

In a conduit assembly of substantial length there should be at least one joint permitting endwise movement of the protecting semitubes, without rupture of the water-tight joints that have been made. Thus, at intervals of 30 feet or so, there may be used an expansion joint of the kind illustrated in Fig. 3. On one side, this joint assembly includes a sleeve extending around an end of a section of the tube (constituted preferably of a pair of semitubes, as described) and defining therewith a space 22 which is closed by an annular ring element 23 that is radially compressed within the said space. This ring element 23 may be composed largely of a resiliently compressible and yieldable material such as rubber or polymerized chloroprene of rubbery consistency, along with fillers and admixtures that are conventional in rubber or polymerized chloroprene compounds. The sleeve may be constituted of cast iron, steel, or the like but preferably is composed of a hardened asbestos and cement composition.

Also, there may be used a plastic caulking composition 24 which is forced tightly into the space 22, outside the sealing ring, and which serves to restrict the entrance of water or air into the said space and to the said ring.

When the assembly has been completed, as described, it is desirable to apply continuously thereover a coating of waterproofing material 25, such as asphalt made fluent by emulsification, by being extended with a small amount of volatile solvent therefor, and/or by being raised to an elevated temperature. This coating adheres to the outside of the assembly and gives an overall water-tight construction.

When such a construction is buried in the earth, for example, the protecting semitubes prevent crushing of the relatively weak insulation therewithin and the flashing means described prevent the entrance of water.

The details that have been given are for the purpose of illustration, not restriction, and variations within the spirit of the invention are intended to be included in the scope of the appended claims.

What we claim is:

1. A conduit comprising a generally horizontally extending elongated member to be protected, a covering disposed therearound and having in transverse cross section a practically circular exterior surface, and a protecting assembly including semitubes arranged in pairs, enclosing the said covering, and forming longitudinal joints between their edges, at the sides of the said covering, and a waterproof flashing element extending through each of the said joints, extending thereabove inside one of the semitubes, and extending therebelow outside the other of the semitubes.

2. A conduit comprising a generally horizontally extending elongated member to be protected, a covering disposed therearound and having in transverse cross section a practically circular exterior surface, and a protecting assembly including semitubes arranged in pairs, enclosing the said covering, and forming longitudinal joints between their edges, at the sides of the said covering, and a waterproof flashing element extending through each of the said joints, extending thereabove inside one of the semitubes, and extending therebelow outside the other of the semitubes, the flashing element including a waterproof sheet and waterproof adhesive material securing it substantially continuously to the inside of the semitube above the joint, to the outside of the semitube below the joint, and to the said abutting edges of the two semitubes.

3. A conduit as described in claim 2, including a layer of waterproof material extending over each of the said joints and adhered to the outside of the semitube above the joint and to the said flashing element outside the semitube below the joint.

4. A conduit comprising a centrally disposed pipe, tubular thermal insulation disposed therearound, and a protecting assembly including strong rigid semitubes arranged in pairs, enclosing the insulation, and forming longitudinal joints between their edge portions, a waterproof flashing sheet extending over each of the said joints, waterproof adhesive material securing the flashing sheet substantially continuously to the outside of the semitubes above and below the joint, and means extending around the assembly at intervals and forcing the two semitubes towards each other.

5. A conduit as described in claim 4, the said means including annular pipe couplings extending between adjacent sections of the pairs of semitubes and waterproof sealing material caulking the union of the couplings with each end of the said sections.

6. A conduit as described in claim 1, the semitubes being constituted of asbestos-cement pipe and a coating of waterproof material being applied continuously over all portions of the exterior surfaces thereof.

7. A conduit comprising an elongated member to be protected, a plurality of sections of rigid material forming a tubular protecting assembly around the said member and meeting to form end joints, and pipe couplings closing the said end joints, in water-tight manner, at least one of the couplings including a circular sleeve extending over and defining an annular space with the end of one of the said sections and a resiliently yieldable, water-impermeable, independently movable ring closing the said space, so that longitudinal movement of the said section of tube within the coupling is permitted.

WILLIAM H. G. MURRAY.
GEORGE H. MINER.